Patented Apr. 3, 1928.

1,665,148

UNITED STATES PATENT OFFICE.

FRANZ TRACHSEL AND JAKOB WIEDMER, OF BERN, AND PAUL ZIGERLI, OF ZURICH, SWITZERLAND.

PROCESS FOR THE PRODUCTION OF ARTIFICIAL STONE AND ARTIFICIAL WOOD.

No Drawing. Application filed May 3, 1926, Serial No. 106,589, and in Switzerland May 1, 1926.

A large number of processes for artificial stone and artificial wood masses are adapted to increase the solidity of the finished products which are mostly brittle, by a reinforcement with fibrous material; a classical solution of the problem and one of the few which has in fact been successful is the mixture of Portland cement and asbestos fibres, in which, exceptionally, the chemical combination between cement and asbestos, assists the result mechanically. The numerous experiments for replacing the expensive asbestos by cheaper organic fibres, have not led to any satisfactory result with the use of cement as a binder, probably because the cement did not combine to a sufficient extent mechanically with the organic fibres which were consequently embedded therein as a useless or even weakening foreign body and very often damaged the finished product by subsequent decomposition.

On the other hand many attempts have been made to use water glass as a binder for the above masses. In practice, however, the high degree of solubility of the water glass prevented satisfactory results being obtained in general so, that per se it does not seriously come into question if the finished product will later on be exposed to any moisture. Its use in combination with other binders is, however, opposed by its strong reaction capacity with the substances which next come into consideration. For example a very slight addition of water glass to cement mortar produces, a product, which when binding appears extremely hard, but when setting gradually loses solidity and is liable to crumble.

Exhaustive practical experiments have now shown an entirely new method—these experiments forming the basis of the present invention of removing the difficulties as regards the use of organic fibres as a reinforcement for mortar masses with the addition of water glass which is subjected to separate preliminary treatment for the purpose of preventing undesirable reactions.

We have ascertained that water glass, thoroughly mixed for example with about 1% addition of pure turpentine oil, loses its later solubility sufficiently for our purposes but not the reaction capacity required for our process. In order to obtain this result a process has been worked out according to the following example.

To 50 kg. of commercial water glass solution we have added 500 gr. pure turpentine oil; the mixture is vigorously stirred until it has a milky appearance. Thereupon it is treated with water until the desired practical dilution is obtained and the fibres, necessary for reinforcement, are thereupon thoroughly treated with this lye which first dissolves the adhering impurities and fatty substances, which would disturb the subsequent binding, and thus purifies the fibres. Hereupon the water glass or water glass solution is caused to react before the fibrous paste is combined with the silica contained in the water glass. Thus for example the addition of milk of lime produces silicate of lime, magnesium chloride lye, magnesium silicate and so forth, therefore a deposit, which in the most serious case acts indifferently in relation to the binders used and in any case forms for these a mineralized preparation of the fibres. As a matter of fact the gel deposit, firmly adhering to the fibres, combines as a silicate, chemically and mechanically, for example with Portland cement; the organic fibres not only do not decompose in this case in the course of time under the action of atmospheric influences, but they prove to be accessible for "petrification" and are interspersed with the microscopic crystals formed without losing their mechanical properties. If the water glass lye is split up by the addition of the precipitant, in which the turpentine addition renders the alkaline components inoffensive in relation to the binder, the latter is added and the mortar completely mixed in the usual manner in order to be formed in the known manner into plates or pieces of other shape.

These products can be further treated according to the nature of the main material by impregnation, painting, coating or other subsequent treatment.

It may be particularly mentioned that asbestos fibres, which with predetermined suitable binders (for example Portland cement) are capable of reacting and produce good products, also produce harder and denser products when preliminarily treated according to the present invention; the silicate gel in this case not only acts as a hardness increasing silica compound but also as a medium for filling the pores.

What we wish to secure by U. S. Letters Patent is:—

1. The process of producing a plastic composition consisting in mixing organic fibrous material with a mixture of water glass and turpentine oil, incorporating a precipitating agent with the mass and adding Portland cement.

2. The process of producing a plastic composition consisting in mixing organic fibrous material with a mixture of water glass solution and turpentine oil, incorporating a precipitating agent with the mass, adding Portland cement, and forming the mixture into molded products.

3. The process of producing a plastic composition consisting in mixing organic fibrous material with a mixture of water glass and turpentine oil, incorporating a precipitating agent with the mass and adding Portland cement and also adding conventional filling material.

In witness whereof we affix our signatures.

FRANZ TRACHSEL.
JAKOB WIEDMER.
PAUL ZIGERLI.